United States Patent [19]
Austin

[11] Patent Number: 4,887,270
[45] Date of Patent: Dec. 12, 1989

[54] CONTINUOUS WAVE, FREQUENCY DOUBLED SOLID STATE LASER SYSTEMS WITH STABILIZED OUTPUT

[75] Inventor: William L. Austin, Tigard, Oreg.

[73] Assignee: Eye Research Institute of Retina Foundation, Boston, Mass.

[21] Appl. No.: 279,282

[22] Filed: Nov. 29, 1988

Related U.S. Application Data

[63] Continuation of Ser. No. 2,081, Jan. 12, 1987, abandoned, which is a continuation-in-part of Ser. No. 857,927, Apr. 30, 1986, abandoned.

[51] Int. Cl.$^4$ .................................................. H01S 3/10
[52] U.S. Cl. ........................................ 372/22; 372/34; 372/35
[58] Field of Search ........................ 372/69, 58, 35, 72, 372/22, 34

[56] References Cited

U.S. PATENT DOCUMENTS

| | | | |
|---|---|---|---|
| 3,355,674 | 11/1967 | Hardy | 372/72 |
| 3,621,457 | 11/1971 | Cuff | 372/72 |
| 3,684,980 | 8/1972 | Kay | 378/75 |
| 3,803,509 | 4/1974 | Steffen | 372/72 |
| 3,975,693 | 8/1976 | Barry et al. | 372/22 |
| 4,096,450 | 6/1978 | Hill et al. | 372/35 |
| 4,127,827 | 11/1978 | Barry | 372/22 |
| 4,232,276 | 11/1980 | Iwata | 372/72 |
| 4,232,876 | 11/1980 | Iwata | 372/72 |

Primary Examiner—Léon Scott, Jr.
Attorney, Agent, or Firm—Chernoff, Vilhauer, McClung & Stenzel

[57] ABSTRACT

A solid-state laser system for producing a frequency-doubled CW laser output beam having a stabilized output. The laser system includes within a three-mirror resonator cavity, a Nd: YAG laser rod operating at an output wavelength of 1.064 μm in the TEMoo transverse mode, and a KTP frequency-doubling crystal. At one end of the laser cavity the beam is reflected from a folding mirror through the frequency-doubling crystal to another reflecting mirror which reflects both the fundamental wavelength of the output beam from the laser rod, and also the doubled frequency beam at a wavelength of 0.532 μm back through the frequency-doubling crystal onto the folding reflector. The folding reflector is coated to reflect light at the longer wavelength but transmits substantially all of the light incident upon it at the 0.532 μm wavelength. Cladding of the laser rod with Spinel or quartz and/or laminar flow cooling of the laser rod are utilized to maintain the temperature distribution over the surface of the laser rod subsantially constant so as to stabilize the output power level at the frequency-doubled wavelength.

6 Claims, 3 Drawing Sheets

CONTINUOUS WAVE, FREQUENCY DOUBLED SOLID STATE LASER SYSTEMS WITH STABILIZED OUTPUT

CROSS REFERENCE TO RELATED APPLICATIONS

This application is a filewrapper continuation of copending application Ser. No. 002,081, filed Jan. 12, 1987, abandoned which is a continuation-in-part of application Ser. No. 857,927, filed Apr. 30, 1986, now abandoned.

FIELD OF THE INVENTION

This invention relates in general to solid state laser systems and more particularly to a continuous wave solid state laser system having an output frequency which is twice that of the laser's fundamental frequency.

BACKGROUND OF THE INVENTION

Laser systems utilizing frequency-doubling solidstate crystals to generate an output beam at a frequency twice the fundamental frequency of the laser rod employed are well known in the art. Typically such systems embody a two-mirror cavity configuration in which reflectors (or mirrors) at either end of the laser rod are coated to reflect substantially all of the optical energy at the fundamental frequency while passing therethrough a substantial portion of the optical beam at twice that frequency. In such an arrangement a suitable frequency-doubling crystal, such as KTP (potassium titanyl phosphate), manufactured by Airtron, a division of Litton Industries, Inc., of Morris Plains, N.J., is placed between one end of the laser and one of the two mirrors. Accordingly, the optical beam at double the fundamental frequency is emitted from the mirrors at either end of the laser. In such an arrangement substantially half of the energy at the doubled frequency is lost since it is propagated in opposite directions. Additionally such prior art lasers have been capable of operating only in the pulse mode because of the intensity level required at the doubled frequency for the laser to be efficient.

One approach that has been employed in the past for producing a pulsed, frequency-doubled solid state laser output is a three-mirror L-shaped optical configuration in which at one end the laser cavity has a mirror for reflecting all of the optical energy at the fundamental frequency which is incident upon it. At the opposite end a folding mirror (i.e., a mirror which is coated for reflection of the fundamental frequency only and positioned at a 45° angle relative to the incident beam) is placed centered on the axis of the laser rod to reflect the beam from the laser rod in a direction normal thereto. A third reflecting mirror, coated to reflect substantially all of the optical energy incident upon it at both the fundamental frequency and at double that frequency, is positioned to intercept the light reflected from the folding mirror and direct it back along that axis onto the folding mirror. Positioned between the folding mirror and the third reflecting mirror is a frequency-doubling crystal. The folding mirror is characterized by providing substantially total reflection of optical energy incident thereon which is at the fundamental frequency emitted by the laser rod while being substantially transparent to incident light at twice that frequency. Accordingly, in such a three-mirror arrangement the frequency-doubled light output is emitted from the laser only at one place, i.e., along the axis through the folding mirror. In some such three-mirror systems it is conventional to employ some focusing, both at the third reflecting mirror at the far side of the solid-state frequency doubling crystal and also on the laser beam as it is emitted from the end of the rod onto the folding reflector. With the frequency-doubling crystals currently available this focusing is needed in the operation of such system in a continuous wave, as opposed to pulsed, mode in order to achieve sufficient intensity inside the frequency-doubling crystal to permit efficient conversion to the doubled frequency.

In attempting to operate the above-described configuration in the CW (continuous wave) mode, high efficiency is very difficult to achieve because it is desirable to utilize substantially the entire diameter of the laser rod for generating the laser beam, in other words, to operate the laser in the so-called transverse TEMoo mode, which corresponds to a uniform gaussian distribution of the light energy over the cross-section of the laser rod. However, the pump radiation from the excitation lamp would ordinarily cause the temperature of the laser rod to rise correspondingly. Cooling techniques, such as the insertion of an optical filter between the excitation lamp and the laser rod to reduce radiation incident on the laser rod which is not useful for producing excitation at the fundamental frequency, have been utilized, and fluid cooling as well as coating of both the laser rod and the excitation lamp have also been employed. However, in such prior art arrangements a stabilized frequency-doubled CW output in the TEMoo mode had not heretofore been achieved—in part because of non-uniform cooling of the laser rod.

By way of explanation, cooling of the laser rod is accomplished by convective transfer of heat from the laser rod into the cooling fluid flowing over the surface of the rod. This causes uneven cooling of the rod surface in both time and space. The resulting temperature variations create optical distortions because of the dependency of the index of refraction of the laser rod on temperature. The effect of the optical distortions on the output power from the laser depends in turn on the laser resonator mirror geometry. This effect is most severe when the laser is operating in the fundamental mode. A time-dependent cavity loss is generated in this case from these optical distortions and results in a significant variation in output power. This output power variation becomes very severe when the fundamental mode is designed to fill most of the rod volume, as in the TEMoo mode, because space is occupied out to the periphery of the laser rod where the index of refraction variations are the greatest.

SUMMARY OF THE INVENTION

Broadly speaking, in the present invention the configuration of the three-mirror L-shaped optical system described previously is employed with an elliptical laser pump cavity including a Nd: YAG laser rod, a suitable excitation lamp and a frequency-doubling crystal. The system optics are arranged to provide for employment of the full diameter of the laser rod, that is, in the TEMoo transverse mode at the fundamental frequency, and at sufficient intensity inside the frequency-doubling crystal, in CW operation, so that efficient output power at the doubled frequency can be achieved. It has been found that by employing the techniques described below the temperature of the laser rod and hence its lasing stability can, in contrast to prior art systems of this type, be maintained substantially constant (within a fraction of a percent) during operation in the CW TEMoo mode. The preferred way of accomplishing this is to provide for a fluid-cooled pump cavity together with a cooling jacket of specific size and materials (such as Spinel or quartz) cladding the laser rod. Also, by the use of a specifically-sized orifice for the pump cavity the fluid flow across the surface of the laser rod can be maintained laminar which provides more constant cooling as a function of time. Either the cladding or the laminar fluid flow can provide sufficient cooling so as to maintain uniform temperature along the length of the laser rod and thereby a stable output power level.

The foregoing and other objectives, features, and advantages of the invention will be more readily understood upon consideration of the following detailed description of the invention, taken in conjunction with the accompanying drawings.

DESCRIPTION OF PREFERRED EMBODIMENT

Figure 1:
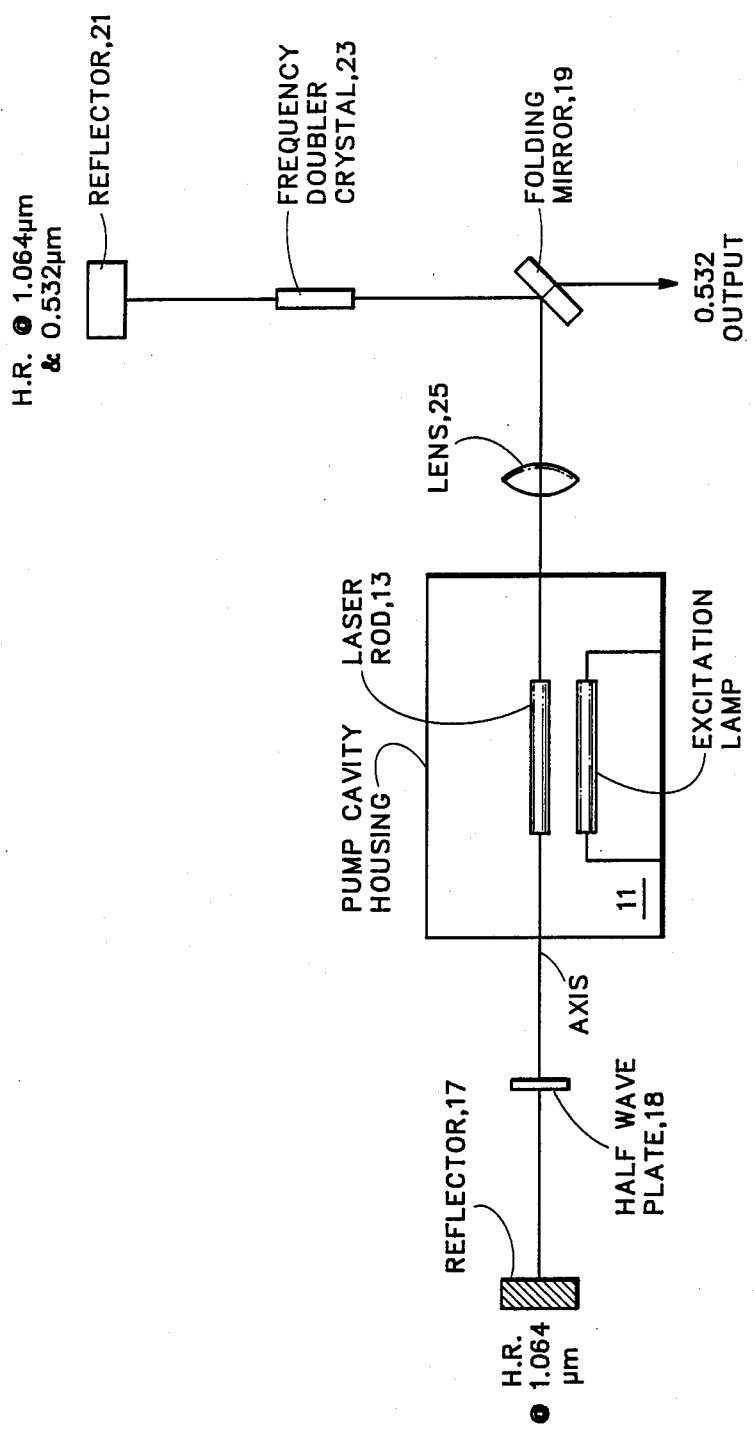
FIG. 1 is an illustration in generally block diagrammatic form of a frequency-doubled solid state laser constructed in accordance with the principles of this invention.

In the exemplary system illustrated in FIG. 1 the pump cavity 11 encloses a conventional parallel excitation lamp 15 which is optically coupled to an elongated solidstate laser rod 13, typically a 4 mm diameter Nd: YAG rod, which produces along the axis of the rod an output laser beam at typically a wavelength of 1.064 um. A reflector mirror 17, highly reflective ("H.R.") at 1.064 um, is positioned at one end of the laser cavity to reflect the laser beam back along the axis. This reflector 17 is formed with an appropriate coating to reflect substantially all of the incident light which is at a wavelength of 1.064 um. At the opposite end of the axis there is positioned a folding mirror 19 coated to reflect substantially all of the light incident upon it at a wavelength of 1.064 um. This light is reflected normal to the axis of the fundamental beam from the laser rod and is then directed to a concave reflecting mirror 21 coated to reflect substantially all light incident upon it at wavelengths of both 1.064 um and 0.532 um. Positioned between the folding reflector 19 and the concave reflector 21 is a frequency-doubling crystal 23.

The frequency doubler crystal may be formed of KTP which has the characteristic of converting a portion of the light energy incident upon it at a wavelength of 1.064 um to a wavelength of 0.532 um. The efficiency of this conversion depends significantly upon the intensity of the incoming light beam. Accordingly, a focusing element 25, which typically is a lens, is positioned to focus the longer wavelength light incident upon the frequency-doubling crystal 23 to a small area to enhance this conversion efficiency. (While the focusing element 25 is shown as a separate lens, the same effect can be achieved by grinding a curvture in the end of the laser rod 13.) Similarly, the concave reflector 21 also focuses the reflected light back onto the crystal 23. The folding mirror 19 is arranged to be substantially transparent to light at the 0.532 um wavelength and hence serves as an exit window from the system for a laser beam of this wavelength. Since the frequency-doubling is efficient only in selected polarization planes, a wave plate 18 may be positioned, if desired, between the end of the laser rod 13 and reflector 17 to rotate the polarization of the beam and align it as necessary.

Figure 2:
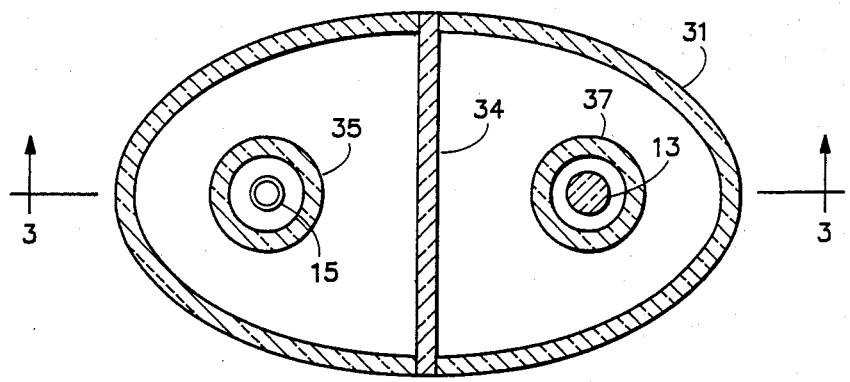
FIG. 2 is a generally cross-sectional, diagrammatic view of an embodiment of an optical laser cavity suitable for employment in the system of FIG. 1.

In order to operate the above-described system in the CW mode with sufficient output power, it is important to achieve both a very highly efficient beam generation as well as high stability in the power output. In the present invention this is achieved by utilizing the full diameter of the Nd: YAG laser rod to generate the beam. In order to operate at these levels of power stability, several extraordinary measures for maintaining the entire volume of laser rod at highly uniform temperature is required. Thus, as illustrated in FIG. 2, the laser pump cavity itself is typically formed of a pyrex glass cylinder 31 of elliptical cross section with the excitation lamp 15 located along one axis and the Nd: YAG laser rod 13 located along the other axis. The excitation lamp can be a conventional krypton lamp having a quartz envelope and tungsten electrode such as that available from ILC Company, of Sunnyvale, California, under the designation ILC No. L3243. The interior surface of the sidewall of the pyrex cavity 31 is coated with a gold deposit, or other highly-reflective coating, to provide for reflection of the lamp energy onto the laser rod. A colored glass filter 34 is positioned between the lamp 15 and the laser rod 13 to absorb that portion of radiation from the lamp which does not serve to excite the lasing energy states of the rod, but yet would heat the rod.

The entire elliptical cavity 31 is cooled by a fluid such as water and includes a cooling flow tube 35 around the lamp 15 and a second cooling flow tube 37 positioned around the laser rod 13. The flow tubes 35 and 37 may be formed of any suitable material such as uranium-doped quartz providing that it is substantially transparent to light from lamp 15 which is of wavelength effective to excite the laser energy states in rod 13. The inner diameter of the flow tube 37 around the 4 mm laser rod 13 may suitably be 9.5 mm. The nature of the fluid flow through this tube is effected by the sizing of the orifice. This orifice is sized such that the flow through the tube along the surface of the rod is substantially laminar, thereby introducing a minimum of variation in the cooling action and maintaining the surface of the rod at a stable temperature distribution. (The surface temperature along the length of the rod is not necessarily the same but the temperature distribution pattern is maintained constant.) This temperature constancy is absolutely critical for providing the stable output laser power with variations, for example, of less than one percent.

Figure 3:
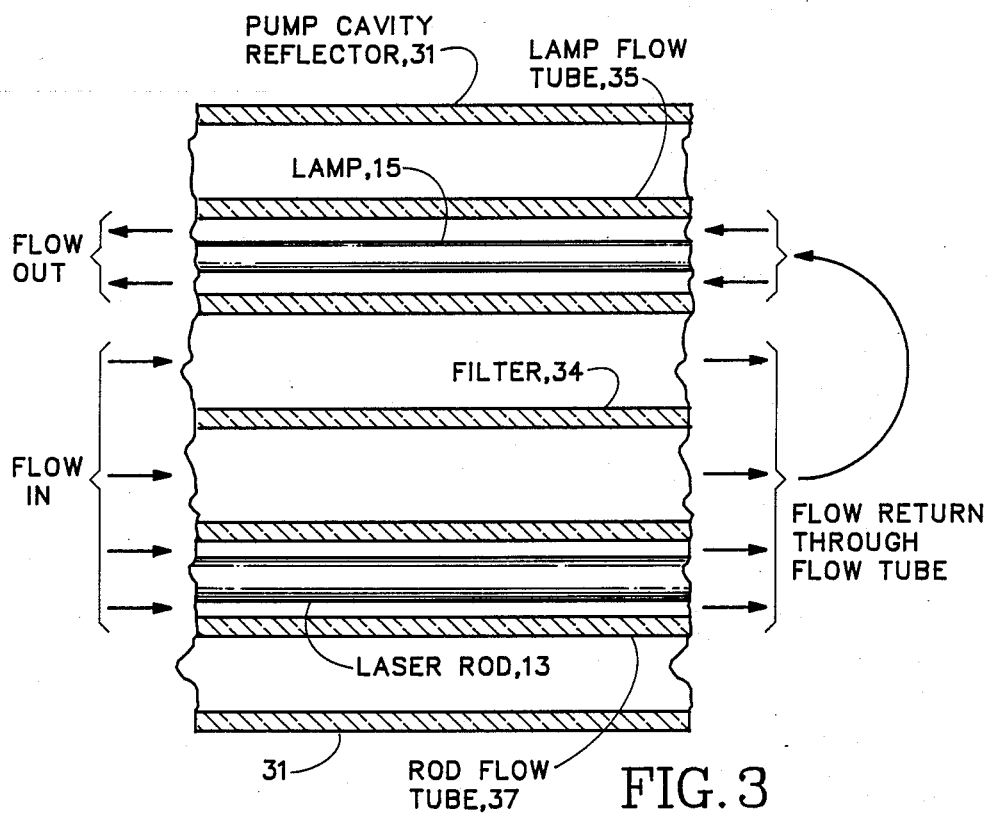
FIG. 3 is a cross-sectional, generally diagrammatic view, taken along the line 3—3 of FIG. 2, of the embodiment of the optical laser cavity shown in FIG. 2.

In FIG. 3 there is illustrated a typical flow configuration in which the cooling fluid is passed in parallel through the pump cavity 31 and laser rod cooling tube 37 and is then returned through the excitation lamp flow tube 35.

Figure 4:
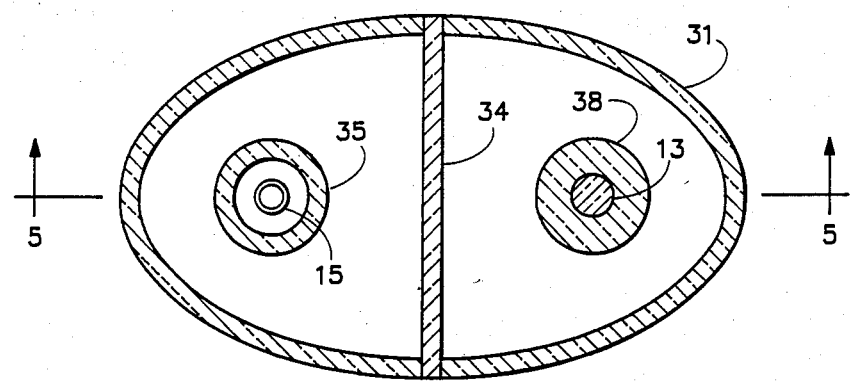
FIG. 4 is a cross-sectional, generally diagrammatic view of a modified embodiment of the optical laser cavity suitable for employment in the system of FIG. 1.
Figure 5:
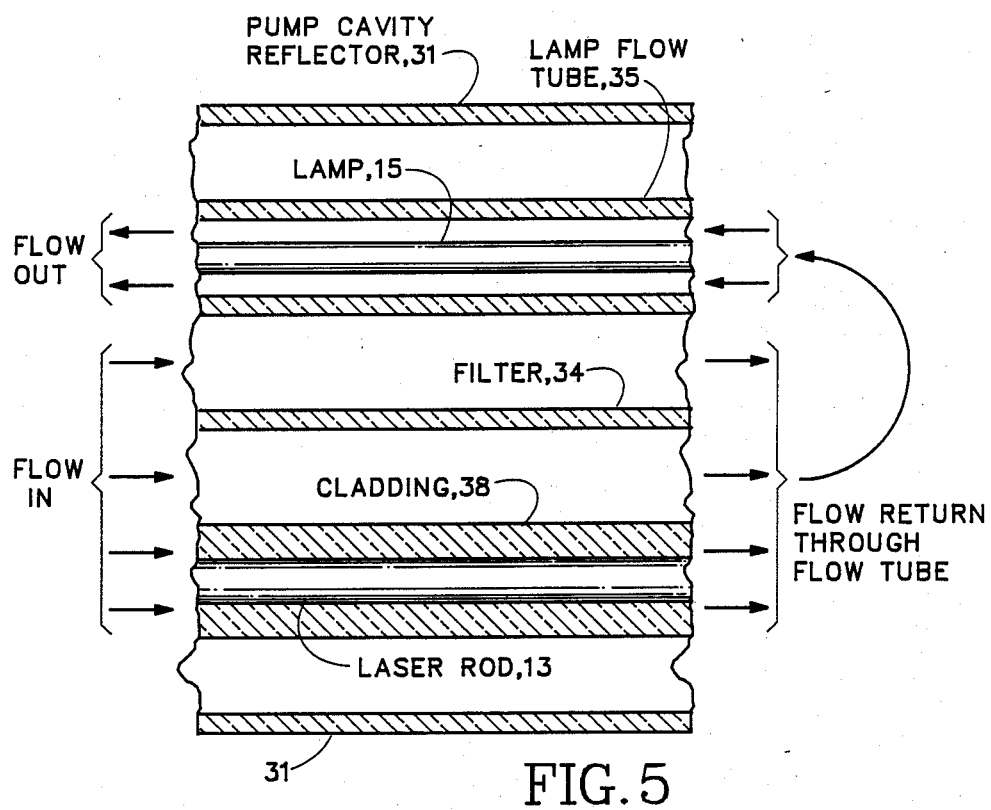
FIG. 5 is a cross-sectional, generally daigrammatic view, taken along the line 5—5 of FIG. 4, of the modified embodiment of the optical laser cavity shown in FIG. 4

In FIGS. 4 and 5 there is illustrated a modified embodiment of the optical laser cavity in which cladding of the laser rod is employed, rather than laminar fluid flow, to maintain the desired constant temperature distribution along the rod. (In this embodiment the same reference numerals refer to the same or similar elements in the firstdescribed embodiment.)

In the modified embodiment the entire elliptical cavity 31 is cooled by a fluid such as water and includes a cooling flow tube 35 around the lamp 15 and a sleeve-like cladding 38 around the laser rod 13 with a thin layer of an optically-transparent, thermally-conductive material, such as a static layer of water or a silicone gel, interposed between the laser rod and the cladding. The cladding 38 may be constructed of any suitable material such as crystalline quartz or Spinel providing that it is substantially transparent to light from the lamp 15 at the wavelength effective to excite the laser energy states in rod 13, and has appropriate thermal and mechanical properties similar to quartz and Spinel to maintain a stable temperature distribution along the laser rod. Exemplarily, the cladding sleeve for the laser rod may have a 4 mm inside diameter and a 14 mm outside diameter and be constructed from the material Spinel (MgO:Al$_2$O$_3$). As depicted, fluid flows through the elliptical pump cavity 31 around the cladding 38 and is returned through the lamp 15 via flow tube 35.

In certain applications it may be desirable to combine both the laminar fluid flow with the cladding sleeve in order to attain a desired cooling effect on the laser rod and thereby maintain the constant temperature distribution pattern required for a stabilized output in a continuous wave, frequency-doubled laser system.

In a typical example a system of the type embodying the principles of the present invention would have the following characteristics:

TABLE 1

| Laser Rod | Nd: YAG, 4 mm diameter |
| --- | --- |
| Frequency-Doubling Crystal | KTP |
| Fundamental Wavelength | 1.064 um |
| System Output | 2 watts CW at 0.532 um |
| Transverse mode | TEMoo |
| Beam Diameter | 3 mm |
| Electrical Input | 208/240 single phase, 10 amp |
| Cooling Requirement | 1500 watts. |

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A laser system for providing a continuous wave, frequency-doubled light beam with a stable power output comprising:
    a laser pump cavity;
    an elongated Nd: YAG solid-state laser rod disposed in said pump cavity;
    an excitation lamp generally coextensive with and positioned parallel to said rod within said pump cavity, said lamp providing output radiation at a frequency suitable for produciing the emission of light radiation by laser action in said rod;
    a filter positioned within said pump cavity between said lamp and said rod to screen output radiation from said lamp which is of a frequency not suited for exciting laser action with said rod;
    a resonator mirror positioned at one end of said rod to reflect axial light back into said rod, said mirror reflecting light at the fundamental frequency of the light radiation emitted by said rod;
    a folding mirror placed at the opposite end of said laser rod, said folding mirror reflecting substantialy all incident light at the fundamental frequency of the light radiation emitted from said laser rod and passing, as an output of said laser system, a light beam at a frequency twice said fundamental frequency;
    a focusing reflector positioned to receive light reflected from said folding mirror and said focusing reflector, said crystal acting to double the frequency of incident light at the wavelength emitted by said rod;
    focusing means for focusing the light radiation emitted by said rod into a small cross-sectional area within said solid-state frequency doubling crystal; and
    cooling means substantially surrounding said rod along a substantial portion of its effective length for maintaining the temperature distribution pattern along the longitudinal surface of said rod substantially constant, thereby to maintain a stable power level in the light beam transmitted at said doubled-frequency as the output of said system and enabling said system to operate in a continuous wave mode, said cooling means including a cooling tube having fluid passed therethrough at a flow rate to produce substantially laminar flow of fluid adjacent the surface of said laser rod.

2. A laser system in accordance with claim 2 wherein said means for maintaining said temperature distribution pattern constant further includes a cladding sleeve of thermally-conductive material optically transparent to light radiation from said excitation lamp at the frequency producing lasing action in said rod, said cladding sleeve substantially surrounding said rod along a substantial portion of its length.

3. A laser system in accordance with claim 2 wherein said cladding sleeve material is formed of Spinel.

4. A laser system in accordance with claim 2 wherein said cladding sleeve material is formed of crystalline quartz.

5. A laser system in accordance with claim 2 wherein said pump cavity is fluid cooled and wherein a cylindrical cooling tube is positioned generally concentric with and parallel to said laser rod, said cooling tube having an orifice which is sized in respect to the fluid flow therethrough so as to maintain a laminar flow adjacent the longitudinal surface of said laser rod.

6. A method for providing a continuous wave, frequency-doubled output laser beam with a stabilized power output comprising the steps of;
    using an excitation lamp, generally coextensive with and positioned parallel to a Nd: YAG solid-state laser rod within a pump cavity, to excite laser states within said rod to produce light emission in the TEM$_{oo}$ mode from said rod at a fundamental lasing frequency;
    positioning a solid-state frequency doubling crystal in the path of said light emission from said laser rod, said crystal acting to double the frequency of incident light at the wavelength emitted by said rod; and cooling said rod to maintain a substantially constant temperature distribution pattern along the longitudinal surface of said rod, thereby to stabilize the power level in the light energy at the doubled frequency passing through said crystal and enabling said rod to be operated in a continuous wave excitation mode with a stabilized output, said cooling is achieved by passing fluid through a cooling tube surrounding said laser rod at a flow rate to produce substantially laminar flow of fluid adjacent the longitudinal surface of said laser rod.

* * * * *

UNITED STATES PATENT AND TRADEMARK OFFICE
CERTIFICATE OF CORRECTION

PATENT NO. : 4,887,270

DATED : December 12, 1989

INVENTOR(S) : William L. Austin

It is certified that error appears in the above-identified patent and that said Letters Patent is hereby corrected as shown below:

Col. 4, line 6, delete "curvture" and insert -- curvature --

Col. 5, line 65, change "produciing" to --producing--

Col. 6, line 15, Claim 1, after "mirror and" insert -- to return said light along said axis back toward said folding mirror; a solid-state frequency doubling crystal positioned between said folding mirror and --

Col. 6, line 35, Claim 2, delete "2" after "Claim" and insert -- 1 --

Signed and Sealed this

Twenty-second Day of June, 1993

Attest:

MICHAEL K. KIRK

*Attesting Officer*     Acting Commissioner of Patents and Trademarks